US012618519B2

(12) United States Patent
Iriyama

(10) Patent No.: US 12,618,519 B2
(45) Date of Patent: May 5, 2026

(54) TANK

(71) Applicant: TOYOTA JIDOSHA KABUSHIKI KAISHA, Toyota (JP)

(72) Inventor: Youjirou Iriyama, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 33 days.

(21) Appl. No.: 18/392,061

(22) Filed: Dec. 21, 2023

(65) Prior Publication Data

US 2024/0263740 A1 Aug. 8, 2024

(30) Foreign Application Priority Data

Feb. 2, 2023 (JP) ................................ 2023-014518

(51) Int. Cl.
*F17C 1/16* (2006.01)

(52) U.S. Cl.
CPC ........ *F17C 1/16* (2013.01); *F17C 2201/0109* (2013.01); *F17C 2203/0604* (2013.01); *F17C 2203/0619* (2013.01)

(58) Field of Classification Search
CPC ................ F17C 1/16; F17C 2201/0109; F17C 2203/0604; F17C 2203/0619; F17C 2203/06; F17C 2203/0602; F17C 2203/0621; F17C 2203/0624; F17C 2203/066; F17C 2203/0697; F17C 2209/221
USPC .......................................................... 220/586
See application file for complete search history.

(56) References Cited

U.S. PATENT DOCUMENTS

| | | | | |
|---|---|---|---|---|
| 2004/0089640 | A1* | 5/2004 | Bager | A61F 5/445 219/121.64 |
| 2008/0223735 | A1* | 9/2008 | Ishikawa | B29C 66/00141 219/121.64 |
| 2017/0268724 | A1* | 9/2017 | Kanezaki | F17C 1/04 |
| 2018/0363849 | A1* | 12/2018 | Keestra | F17C 1/16 |
| 2019/0315225 | A1* | 10/2019 | Duez | B60K 15/03006 |
| 2022/0258446 | A1* | 8/2022 | Hochstetter | C08G 69/265 |

FOREIGN PATENT DOCUMENTS

| | | |
|---|---|---|
| JP | 2006-242247 A | 9/2006 |
| JP | 2017-166535 A | 9/2017 |

OTHER PUBLICATIONS

Burell et al., Design of Experiment to Optimize Absorber in Resin Welding Parameters, ANTEC 2007, pp. 1913-1917 (Year: 2007).*

* cited by examiner

*Primary Examiner* — Laura E. Parker
(74) *Attorney, Agent, or Firm* — SoraIP, Inc.

(57) ABSTRACT

The tank has a liner configured by joining a plurality of liner components, each of which is at least partially cylindrical, and a reinforcing layer arranged on the outer circumference of the liner. The plurality of liner components includes a first liner component having a first joint portion and a second liner component having a second joint portion. The first joint portion has a plurality of resin layers, and the bottom layer of the first joint portion is a heat-sealable layer containing an absorbent. The second joint portion contains absorbent material. The first joint portion is laminated on the second joint portion, and the first joint portion and the second joint portion are joined by a heat-sealing portion.

8 Claims, 2 Drawing Sheets

TANK

CROSS-REFERENCE TO RELATED APPLICATION

This application claims priority to Japanese Patent Application No. 2023-014518 filed on Feb. 2, 2023, incorporated herein by reference in its entirety.

BACKGROUND

1. Technical Field

The present application relates to tanks.

2. Description of Related Art

As a high-pressure gas tank for storing hydrogen gas, etc., a tank having a hollow cylindrical liner in which a reinforcing layer is disposed known. Such a tank is described, for example, in Japanese Unexamined Patent Application Publication No. 2006-242247 (JP 2006-242247 A).

JP 2006-242247 A discloses a gas container having a resin liner configured by joining a plurality of liner components, each of which is at least partially hollow and cylindrical, and a reinforcing layer disposed on the outer periphery of the resin liner. In this gas container, joint portions of a plurality of liner components are joined to each other by laser welding. The document also discloses that laser welding is performed in a state in which a laser-transmitting liner component and a laser-absorbing liner component are in contact with each other. By carrying out laser welding, the laser-absorbing liner component is heated and melted, and the laser-transmitting liner component is thermally melted by heat transfer from the laser-absorbing liner component.

SUMMARY

In JP 2006-242247 A, the laser-transmitting liner component does not contain an absorber. Therefore, the laser-transmitting liner component is melted only by heat transfer from the laser-absorbing liner component, and these liner components are joined.

However, according to the knowledge of the present inventors, there is a possibility that such a welding method cannot secure sufficient bonding strength because the amount of fusion of the heat-sealing portion that joins the liner components is not sufficient. In addition, when the laser welding time is lengthened in order to secure the melting amount, there is a problem that the laser-absorbing liner component is overheated and voids are generated due to burning or gasification in the heat-sealing portion.

Therefore, in view of the above circumstances, a main object of the present disclosure is to provide a tank that can appropriately ensure the bonding strength of the liner components.

The present disclosure provides at least the following aspects.

A first aspect is a tank that includes: a liner configured by joining a plurality of liner components, each of which is at least partially cylindrical; and a reinforcing layer disposed on an outer periphery of the liner.

The liner components each include a first liner component including a first joint portion, and a second liner component including a second joint portion.

The first joint portion includes a plurality of resin layers, a bottom layer of the first joint portion is a heat-sealing layer containing an absorbent, the second joint portion includes an absorbent, the first joint portion is laminated on the second joint portion, and the first joint portion and the second joint portion are joined by a heat-sealing portion.

A second aspect is, in the first aspect, the tank in which a laser absorptance of the bottom layer of the first joint portion is 0.3 or more and 0.6 or less, and a laser absorptance of the second joint portion is 0.9 or more and 1.0 or less.

A third aspect is, in the first aspect, is the tank in which the first joint portion includes a gas barrier layer, the heat-sealing layer, and the bottom layer, and the heat-sealing layer is disposed between the gas barrier layer and the bottom layer.

According to the tank of the present disclosure, it is possible to appropriately ensure the bonding strength of the liner components.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The tank of the present disclosure will be described using a tank 1000 as one embodiment.

Tank 1000

The tank 1000 can be filled with gas. The type of gas is not particularly limited. Examples include hydrogen and natural gas. Also, the gas is normally filled in the tank body 100 in a high pressure state.

Figure 1:
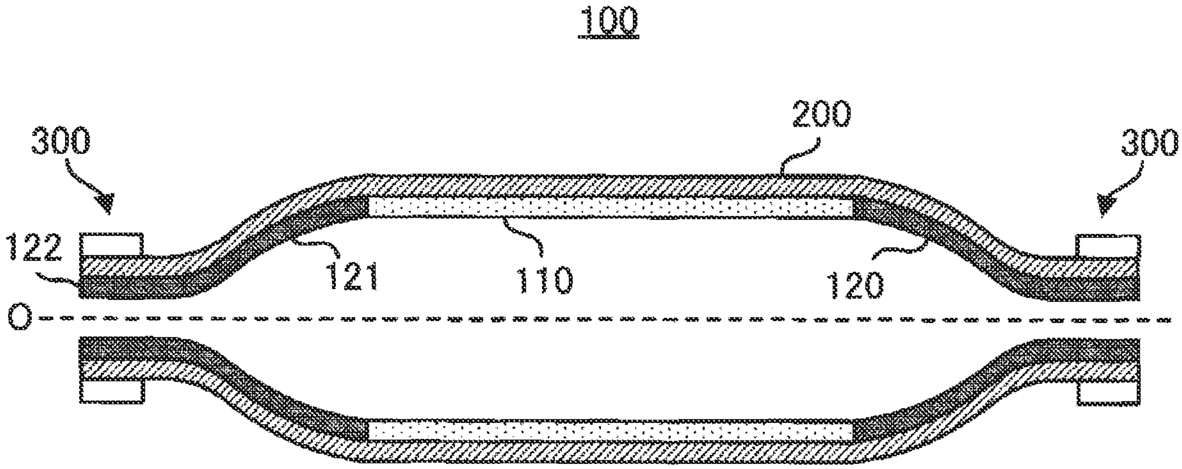
FIG. 1 is a cross-sectional view of a tank 100.

A cross-sectional view of tank 1000 is shown in FIG. 1. The tank 1000 has a liner 100 and a reinforcing layer 200 arranged around the outer circumference of the liner 100. In addition, the tank 1000 has a mouthpiece 300 at the end in the axial direction (the direction along the central axis O of the tank 1000).

Liner 100

The liner 100 is made of resin having gas barrier properties. The liner 100 is constructed by joining a plurality of liner components, each of which is at least partially cylindrical. The liner component having at least a portion (one end side) of a cylindrical shape includes, for example, a liner component having a shape such as a cylindrical shape, an annular shape, a bowl shape, a dome shape, or the like as a whole.

As shown in FIG. 1, the liner 100 has a first liner component 110 and second liner components 120, 120. The first liner component 110 has a cylindrical shape and is a so-called body portion of the liner 100. The second liner component 120 has a dome portion 121 and a small-diameter end portion 122. The dome portion 121 has a dome shape, and has a shape whose diameter decreases toward the outside in the axial direction. The small-diameter end portion 122 has a cylindrical shape with a diameter smaller than that of the second liner component 120. The small-diameter end portion 122 has an opening on its axially outer surface, and this opening communicates with the interior of the liner 100. Gas is charged and discharged from the inside of the liner 100 through the opening. As shown in FIG. 1, the second liner components 120 are arranged at both ends of the first liner component 110 in the axial direction.

Figure 2:
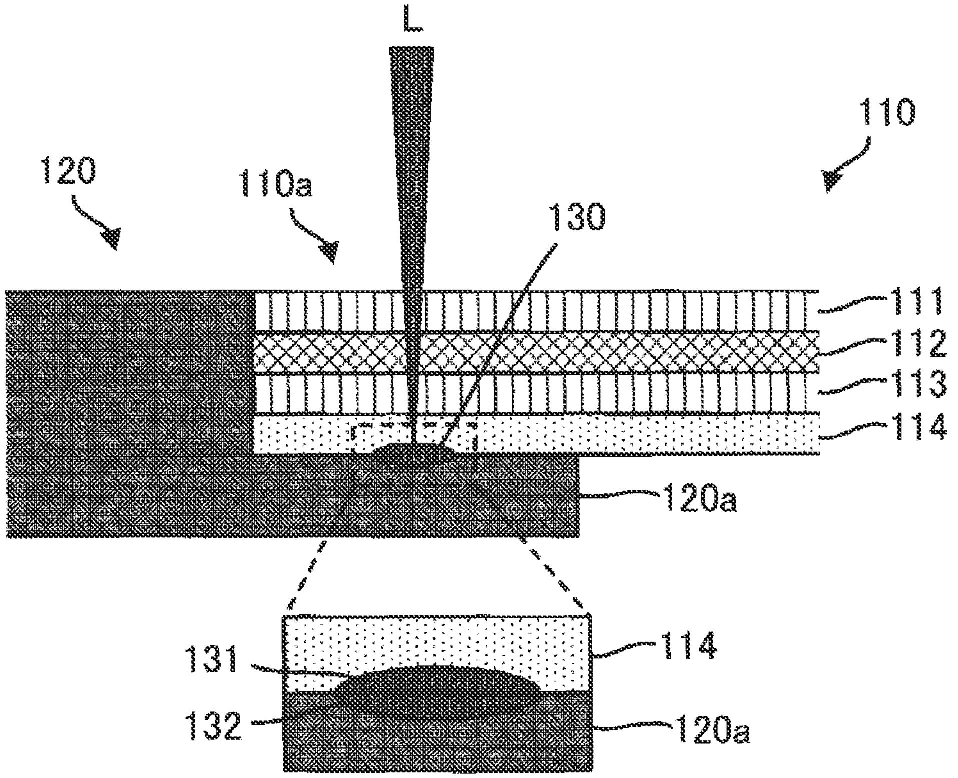
FIG. 2 is an enlarged view of a joint portion between the first liner component 110 and the second liner component 120.

The configurations of the first liner component 110 and the second liner component 120 will be further described with reference to FIG. 2. FIG. 2 shows an enlarged view of a joint portion between the first liner component 110 and the second liner component 120.

First Liner Component 110

The first liner component 110 has laser transparency. "Laser transmissive" means the property of transmitting part of the irradiated laser. For example, the laser absorptance of the first liner component 110 may be 0.2 or more and less than 0.8. From the viewpoint of transmitting the laser and securing the amount of melting, the laser absorptivity of the first liner component 110 may be 0.3 or more and 0.6 or less. The laser absorptivity indicates the rate at which the material absorbs the laser with respect to the laser input. The laser absorptance is calculated by measuring, with a detector, the transmitted portion of the laser beam irradiated to the target material. Such measurements can be performed by known measuring instruments.

As shown in FIG. 2, the first liner component 110 includes four resin layers (first resin layer 111, second resin layer 112, third resin layer 113, and fourth resin layer 114). The thickness of the first liner component 110 is not particularly limited, but may be, for example, 400 μm or more and 2 mm or less, or 500 μm or more and 1 mm or less, from the viewpoint of ensuring laser transparency.

The first resin layer 111 is the outermost resin layer (uppermost layer) and a protective layer. Although the material of the first resin layer 111 is not particularly limited, examples thereof include thermoplastic resins such as polyethylene, polypropylene, and polyamide. Although the thickness of the first resin layer 111 is not particularly limited, it may be, for example, 80 μm or more and 500 μm or less. The laser absorptance of the first resin layer 111 is not particularly limited, but may be, for example, 0.2 or less, 0.1 or less, 0.05 or less, or 0.

The second resin layer 112 is a gas barrier layer arranged inside the first resin layer 111. The material of the second resin layer 112 is not particularly limited as long as it is a resin having gas barrier properties. Examples of materials for the second resin layer 112 include biaxially oriented polyethylene, polypropylene, polyvinylidene chloride, and ethylene-vinyl alcohol copolymer resin. The thickness of the second resin layer 112 is not particularly limited, but may be 80 μm or more and 500 μm or less, or 150 μm or more and 300 μm or less, from the viewpoint of ensuring sufficient gas barrier properties. The laser absorptance of the second resin layer 112 is not particularly limited, but may be, for example, 0.2 or less, 0.1 or less, 0.05 or less, or 0.

The third resin layer 113 is a resin layer arranged inside the second resin layer 112 and is a heat-adhesive layer having a role of protecting the second resin layer 112 from melting of the fourth resin layer 114. Therefore, the third resin layer 113 is arranged between the second resin layer 112 and the fourth resin layer 114. Although the material of the third resin layer 113 is not particularly limited, examples thereof include thermoplastic resins such as polyethylene, polypropylene, and polyamide. Although the thickness of the third resin layer 113 is not particularly limited, it may be, for example, 80 μm or more and 500 μm or less. Although the laser absorptance of the third resin layer 113 is not particularly limited, it may be 0.2 or less, 0.1 or less, 0.05 or less, or 0, for example.

The fourth resin layer 114 is the innermost resin layer (lowermost layer) and is a heat-scalable layer containing an absorbent material. The fourth resin layer 114 has a thermoplastic resin and an absorbent. The fourth resin layer 114 may be made of a thermoplastic resin and an absorbent material. Thus, only the fourth resin layer 114, which is the bottom layer, among the resin layers forming the first liner component 110 contains an absorbent. The thermoplastic resin forming the fourth resin layer 114 is not particularly limited, but examples thereof include polyethylene, polypropylene, and polyamide. The absorber may be any material that can absorb the laser. Examples of absorbents include carbon materials such as carbon black. The content of the absorbent in the fourth resin layer 114 may be appropriately adjusted so as to achieve the desired laser absorptance. Although the laser absorptance of the fourth resin layer 114 is not particularly limited, it is, for example, 0.3 or more and 0.6 or less. From the viewpoint of adjusting the melting amount, the laser absorptance of the fourth resin layer 114 may be 0.4 or more and 0.5 or less. The thickness of the fourth resin layer 114 is not particularly limited, but may be 80 μm or more and 500 μm or less, or 150 μm or more and 300 μm or less, from the viewpoint of ensuring a sufficient melting amount.

Figure 3:
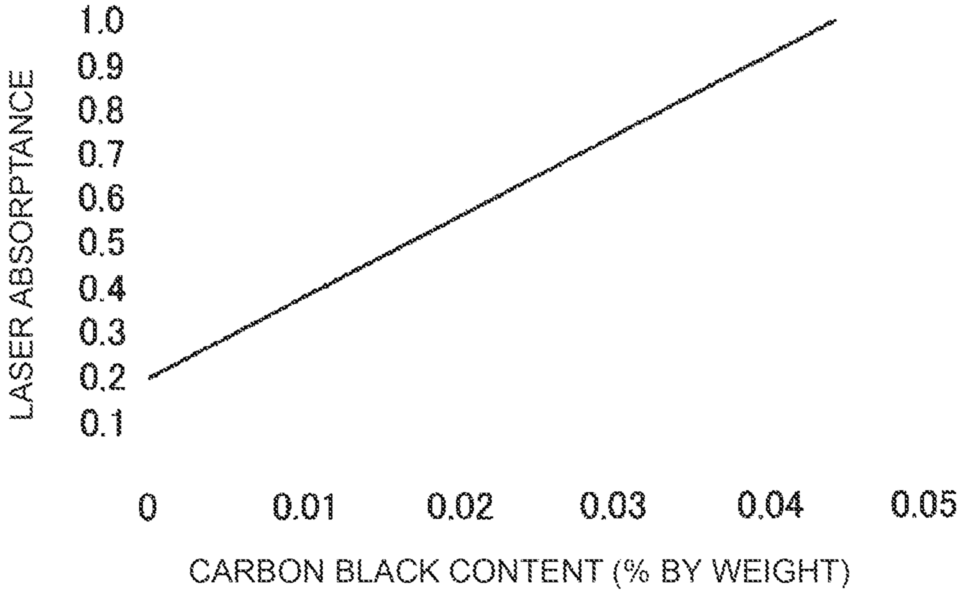
FIG. 3 shows the relationship between the carbon black content in the resin layer and the laser absorptance.

FIG. 3 shows, as an example, the relationship between the content (% by weight) of carbon black in a resin layer in which carbon black is mixed with polyamide resin and the laser absorptance. According to FIG. 3, when a carbon material such as carbon black is used as the absorbent, the content of the carbon material in the fourth resin layer 114 may be 0.006% by weight or more and 0.023% by weight or less. From the viewpoint of adjusting the melting amount, the content of the carbon material in the fourth resin layer 114 may be 0.011% by weight or more and 0.017% by weight or less.

Here, as shown in FIG. 2, the first liner component 110 is laminated on the second liner component 120. Specifically, the first liner component 110 is laminated so as to be arranged outside the second liner component 120. Laser welding is performed on this laminated portion. Therefore, the portion of the first liner component 110 that contacts the second liner component 120 (second joint portion **120*a*, which will be described later) is referred to as a first joint portion 110*a*. That is, the first liner component 110 has a first joint portion 110*a* for joining with the second liner component 120 (second joint portion 120*a*). The first joint portion 110*a* exists along the circumferential direction of the first liner component 110**.

Second Liner Component 120

The second liner component 120 has laser absorbency. "Laser absorption" means the property of absorbing most or all of the irradiated laser. For example, the laser absorptance of the second liner component 120 may be 0.8 or more and 1.0 or less. From the viewpoint of more laser absorption, the second liner component 120 may have a laser absorptance of 0.9 or more and 1.0 or less.

The second liner component 120 is a heat-scalable layer containing absorbent material. The second liner component 120 has a thermoplastic resin and an absorbent material. The second liner component 120 may be made of a thermoplastic resin and an absorbent material. The thermoplastic resin forming the second liner component 120 is not particularly limited, but examples thereof include polyethylene, polypropylene, and polyamide. The absorber may be any material that can absorb the laser. Examples of absorbents include carbon materials such as carbon black. The content of the absorbent in the second liner component 120 may be appropriately adjusted so as to achieve the desired laser absorptance. The thickness of the second liner component 120 is not particularly limited, but may be 500 μm or more and 5 mm or less, or 800 μm or more and 3 mm or less from the viewpoint of ensuring a sufficient melting amount and gas barrier properties.

Further, according to FIG. 3, when a carbon material such as carbon black is used as the absorbent, the content of the carbon material in the second liner component 120 may be 0.034% by weight or more. From the viewpoint of adjusting the melting amount, the content of the carbon material in the second liner component 120 may be 0.039% by weight or more.

As shown in FIG. 2, the second liner component 120 has a protruding portion (second joint portion 120*a*) that protrudes axially inward from below its axially inner surface. The second joint portion 120*a* is a portion for joining with the first joint portion 110*a*. The second joint portion 120*a* exists along the circumferential direction of the second liner component 120. The length in the axial direction of the second joint portion 120*a* is not particularly limited as long as the length is enough to form the heat-scaling portion, and may be, for example, 5 mm or more and 20 mm or less. The thickness of the second joint portion 120*a* is not particularly limited, but may be 80 μm or more and 5 mm or less, or 150 μm or more and 3 mm or less, from the viewpoint of ensuring a sufficient melting amount. Joining the first joint portion 110*a* and the second joint portion 120*a*

As shown in FIG. 2, the first liner component 110 is arranged in abutment with the second liner component 120 such that the inner surface (lower surface) of the first joint portion 110*a* in the stacking direction contacts the outer surface (upper surface) of the second joint portion 120*a* in the stacking direction. At this time, the outer surface (upper surface) of the first liner component 110 in the stacking direction and the outer surface (upper surface) of the second liner component 120 in the stacking direction may be flush with each other. This is for facilitating placement of the reinforcing layer 200. However, the outer surface of the first liner component 110 and the outer surface of the second liner component 120 may have a step.

Also, the first joint portion 110*a* is laminated on the second joint portion 120*a*, and these are joined by the heat-sealing portion 130. The heat-scaling portion 130 is formed along the circumferential direction. In FIG. 2, there is one heat-sealing portion 130, but there may be a plurality of them. In that case, the plurality of heat-sealing portions 130 may be formed side by side in the axial direction. The axial length of the heat-sealing portion 130 is not particularly limited, but may be 1 mm or more and 5 mm or less, or 2 mm or more and 4 mm or less, from the viewpoint of ensuring gas barrier properties and bonding strength.

Formation of Heat-Scaling Portion 130

An enlarged view of the heat-scaling portion 130 is shown at the bottom of FIG. 2. The heat-scaling portion 130 is formed by laser welding. Since the laser L is irradiated from the outside of the liner 100, the laser transmissive first joint portion 110*a* is laminated on the laser absorptive second joint portion 120*a*. When the laser L is irradiated, the laser L passes through the first joint portion 110*a* and reaches the second joint portion 120*a*. The laser L reaching the second joint portion 120*a* melts a portion (irradiation portion) of the second joint portion 120*a*. This melted portion serves as the second joint portion side heat-scaling portion 132. In addition, since the fourth resin layer 114 of the first joint portion 110*a* contains an absorbing material, the fourth resin layer 114 partially absorbs the laser L, and a portion of the fourth resin layer 114 (irradiated portion) melts. This melted portion serves as the first joint portion side heat-sealing portion 131. Then, the first joint portion side heat-scaling portion 131 and the second joint portion side heat-sealing portion 132 are joined to form the heat-sealing portion 130.

The bonding strength of the heat-sealing portion 130 is affected by the amount of melting of the first joint portion side heat-scaling portion 131 and the second joint portion side heat-scaling portion 132. The melting amount means the depth of the heat-sealing portion. The amount of melting of the first joint portion side heat-scaling portion 131 and the second joint portion side heat-sealing portion 132 is set in consideration of the bonding strength of the heat-sealing portions 130 and the number of the heat-sealing portions 130. For example, from the viewpoint of increasing the bonding strength, the melting amount of the first joint portion side heat-scaling portion 131 may be 40 μm or more and 300 μm or less, or may be 60 μm or more and 150 μm or less. Similarly, the melting amount of the second joint portion side heat-sealing portion 132 may be 40 μm or more and 300 μm or less, or may be 60 μm or more and 150 μm or less. If the melted amount is less than 40 μm, the bonding strength may not be sufficient. However, even if the melted amount is less than 40 μm, a sufficient bonding strength can be obtained by increasing the number of the heat-scaling portions 130. If the melted amount exceeds 300 μm, the melted amount becomes too large and may affect other layers. For example, if the heat-sealing portion 130 reaches the second resin layer 112, the thickness of the second resin layer 112 may change, or the state of the material may change, thereby degrading the gas barrier properties. The amount of melting of the first joint portion side heat-sealing portion 131 and the melting amount of the second joint portion side heat-sealing portion 132 may be the same or different.

Method for Manufacturing Liner 100

Although the method of manufacturing the liner 100 is not particularly limited, the liner 100 is manufactured, for example, as follows. First, the first liner component 110 and the second liner components 120, 120 are produced. A method for manufacturing the first liner component 110 is not particularly limited, but extrusion molding may be used from the viewpoint of easily manufacturing the first liner component 110 having a plurality of resin layers. A method for manufacturing the first liner component 110 is not particularly limited, but injection molding may be used from the viewpoint of easily manufacturing the dome portion 121 and the small-diameter end portion 122. Next, one opening of the obtained first liner component 110 and the opening of the second liner component 120 on the side of the dome portion 121 are arranged to face each other as shown in FIG. 2. Laser welding is then performed. Thereby, the liner 100 can be manufactured.

Reinforcing Layer 200

The reinforcing layer 200 is a member that covers the entire outer surface of the liner 10 and ensures the strength of the tank 1000. The reinforcing layer 200 is made of fiber-reinforced resin such as carbon fiber. Generally, the reinforcing layer 200 is formed by weaving a fiber bundle formed by bundling a plurality of fiber-reinforced resins on the surface of the liner 100. The reinforcing layer 200 can be formed by, for example, a braiding method.

Mouthpiece 300

The mouthpiece 300 is a cylindrical member arranged at the small-diameter end portion (the portion corresponding to the small-diameter end portion 122) of the tank 1000, and serves to connect the tank 1000 and other members.

Examples of other members include manifolds and valve members. The mouthpiece 300 is made of metal such as stainless steel. Such bases 300 are known.

Supplement

An embodiment has been used to describe the tank of the present disclosure. The tank of the present disclosure will be supplemented below.

In one embodiment, the liner 100 is configured by a first liner component 110 that is cylindrical and second liner components 120, 120 having domed portions. However, the tank of the present disclosure is not limited to this. For example, the liner may consist of two liner components having domed portions. In this case, one liner component may be the first liner component, and the other liner component may be the second liner component.

In one embodiment, the second liner components 120, 120 both have small-diameter end portions 122. However, the tank of the present disclosure is not limited to this. For example, only one second liner component may have a reduced diameter end and the other second liner component may not have a reduced diameter end.

In one embodiment, the number of resin layers of the first liner component 110 is four layers. However, the tank of the present disclosure is not limited to this. The first liner component 110 may have a plurality of resin layers. For example, the first liner component may be composed of three resin layers. In this case, the first liner component may be provided with a protective layer, a gas barrier layer, and a lowermost layer (a heat-scalable layer containing an absorbent) in this order. However, in this case, since the heat-scalable layer is not provided between the gas barrier layer and the lowermost layer, the outer portion of the lowermost layer may be heated to deteriorate the gas barrier layer. Also, in the case of a three-layer structure, the bottom layer may be formed relatively thick, which may reduce the energy of the laser reaching the second joint portion. In that case, it is necessary to increase the power of the laser. On the other hand, when the first liner component has a three-layer structure, it is possible to simplify the manufacturing equipment and the like as compared with the case of a four-layer structure.

In one embodiment, the first liner component 110 as a whole had multiple resin layers. However, the tank of the present disclosure is not limited to this. For example, the first liner component may have a plurality of resin layers only at the first joint portion, and the construction of other portions is not particularly limited. However, from the viewpoint of case of manufacture, it is sufficient that the first liner component is composed of a plurality of resin layers as a whole.

In one embodiment, the second liner component 120 is constructed entirely from a thermoplastic layer that includes an absorbent material. However, the tank of the present disclosure is not limited to this. For example, the second liner component may be configured such that only the second joint portion is composed of the thermoplastic resin layer containing the absorbing material, and the configuration of the other portions is not particularly limited. However, from the viewpoint of case of manufacture, it is sufficient that the second liner component as a whole is composed of a thermoplastic resin layer containing an absorbent material.

The tank of the present disclosure is further described using examples.

The liners of Examples 1 and 2 and Comparative Example were produced according to the above description. Laser welding was performed using a commercially available semiconductor laser welder. The welding conditions were an output of 180 W, a laser wavelength of 940 nm, and a focal diameter of 3 mm.

Table 1 shows the configurations of the liners of Examples 1 and 2 and Comparative Example. As shown in Table 1, the first liner component of Example 1 has four resin layers. The first liner component of Example 2 has three resin layers. The first liner component of the comparative example has three resin layers. As shown in Table 1, Examples 1 and 2 have an absorber (CB) in the bottom layer of the first liner component. In contrast, the comparative example does not have an absorber in the bottom layer of the first liner component.

The materials shown in Table 1 will now be described. PA means polyamide. EVOH means ethylene vinyl alcohol copolymer resin. PA with CB means a mixture of polyamide resin and carbon black. Numerical values shown in parentheses are laser absorptances.

Further, Table 1 shows the melting amounts of the heat-scaling portion portions formed by laser welding (the melted amount of the heat-sealing portion on the first joint portion side and the melted amount of the heat-sealing portion on the second joint portion side). The melted amount was measured by cutting the heat-sealing portion of each test example and measuring the cross-sectional microscopic image.

In addition, the bonding strength (peel strength) of the liners of Examples 1, 2 and Comparative Example was tested. A bonding strength test was performed as follows. First, a strip-shaped test piece including a heat-sealing portion was cut out from each test example in which the first liner component and the second liner component were welded. Next, the non-welded portions of the first liner component and the second liner component were gripped by a strength tester, and the respective members were pulled in the direction of 90 degrees, thereby peeling off the heat-sealing portions. At that time, the load per unit length of the heat-sealing portion was measured and defined as the bonding strength (N/mm). Results are shown in Table 1.

TABLE 1

| | | Example 1 | Example 2 | Comparative example |
|---|---|---|---|---|
| First liner component | Material of the first resin layer | PA | PA | PA |
| | Material of the second resin layer | EVOH | EVOH | EVOH |
| | Material of the third resin layer | PA | PA with CB (1.0) | PA (0.0) |
| | Material of the fourth resin layer | PA with CB (0.3) | — | — |
| Materials for second liner components | | PA with CB (1.0) | PA with CB (1.0) | PA with CB (1.0) |
| Amount of melting at the heat-sealing portion on the first joint side (μm) | | 80 | 60 | 30 |
| Amount of melting of the heat-sealing portion on the second joint side (μm) | | 80 | 90 | 120 |
| Bond strength (N/mm) | | 20 | 17 | 11 |

From Table 1, the bonding strength of Examples 1 and 2 was sufficiently ensured. This is because the lowermost layer of the first liner component of Examples 1 and 2 contains CB, which is an absorbent material, so that the melted amount of the heat-sealing portion on the first joint portion side has a sufficient depth. It is thought that this is because On the other hand, the joint strength of the comparative example was low. This is because the lowermost layer of the first liner component of the comparative example does not contain CB, which is an absorbing material, so that the melted amount of the heat-scaling portion on the side of the first joint portion did not have a sufficient depth. It is believed that there is.

What is claimed is:

1. A tank comprising:

a liner comprising a plurality of liner components, each of which is at least partially cylindrical;

a reinforcing layer disposed on an outer periphery of the liner, wherein:

the plurality of liner components include a first liner component including a first joint portion, and a second liner component including a second joint portion;

the first joint portion is laminated on the second joint portion;

the first joint portion includes a plurality of resin layers, the plurality of resin layers including a bottom layer which is present in an innermost side of the tank;

the bottom layer of the first joint portion is a first heat-sealing layer containing a first absorbent comprising a carbon black, a content of the carbon black in the bottom layer is 0.011% by weight or more and 0.017% by weight or less with respect to a total % by weight of the bottom layer;

the second joint portion includes a second absorbent comprising a carbon black;

the bottom layer of the first joint portion and the second joint portion are joined at a heat-sealing portion;

the first joint portion includes a gas barrier layer, a second heat-sealing layer, and the bottom layer;

the second heat-sealing layer is disposed between the gas barrier layer and the bottom layer;

the first joint portion further includes an outermost resin layer present on the gas barrier layer, and a thickness of the second liner component is equal to a total thickness of the first joint portion and the second joint portion.

2. The tank according to claim 1, wherein:

a laser absorptance of the bottom layer of the first joint portion is 0.3 or more and 0.6 or less; and a laser absorptance of the second joint portion is 0.9 or more and 1.0 or less.

3. The tank according to claim 1, wherein:

the heat-sealing portion includes a first heat-sealing portion and a second heat-sealing portion, the bottom layer includes the first heat-sealing portion;

the second joint portion includes the second heat-sealing portion; and a thickness of the first heat-sealing portion is 40 μm or more and 300 μm or less in a radial direction of the tank, and a thickness of the second heat-sealing portion is 40 μm or more and 300 μm or less in the radial direction of the tank.

4. The tank according to claim 1, wherein a thickness of the first liner component is 400 μm or more and 2 mm or less.

5. The tank according to claim 4, wherein a thickness of the bottom layer of the first joint portion is 80 μm or more and 500 μm or less.

6. The tank according to claim 1, wherein a thickness of the bottom layer of the first joint portion is 80 μm or more and 500 μm or less.

7. The tank according to claim 1, wherein a thickness of the bottom layer of the first joint portion is 150 μm or more and 300 μm or less.

8. The tank according to claim 1, wherein:

the heat-sealing portion includes a first heat-sealing portion and a second heat-sealing portion;

the bottom layer includes the first heat-sealing portion;

the second joint portion includes the second heat-sealing portion;

a thickness of the first heat-sealing portion is 40 μm or more and 300 μm or less in a radial direction of the tank;

a thickness of the second heat-sealing portion is 40 μm or more and 300 μm or less in the radial direction of the tank;

a thickness of the first liner component is 400 μm or more and 2 mm or less; and a thickness of the bottom layer of the first joint portion is 80 μm or more and 500 μm or less.

* * * * *